(12) United States Patent
Determan et al.

(10) Patent No.: US 7,902,264 B2
(45) Date of Patent: Mar. 8, 2011

(54) POLYTRIMETHYLENE TEREPHTHALATE (PTT) DERIVED FROM POLYETHYLENE TEREPHTHALATE (PET) AND CONTAINING PET RESIDUES

(75) Inventors: Michael Determan, St. Paul, MN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/616,373

(22) Filed: Dec. 27, 2006

(65) Prior Publication Data

US 2007/0225473 A1 Sep. 27, 2007

Related U.S. Application Data

(60) Provisional application No. 60/820,447, filed on Jul. 26, 2006, provisional application No. 60/763,093, filed on Jan. 27, 2006, provisional application No. 60/777,901, filed on Mar. 1, 2006.

(51) Int. Cl.
*C08J 11/04* (2006.01)

(52) U.S. Cl. ......... 521/48.5; 521/40; 521/40.5; 521/41; 521/44; 521/48; 528/271; 528/272; 528/279; 528/280; 528/283; 528/300; 528/480; 528/491; 528/495

(58) Field of Classification Search .......... 528/271, 528/272, 300, 301, 480, 275, 279, 280, 491, 528/495; 521/40, 40.5, 41, 48, 48.5, 44
See application file for complete search history.

(56) References Cited

U.S. PATENT DOCUMENTS

| | | | |
|---|---|---|---|
| 2,465,319 A | 3/1949 | Whinfield et al. | |
| 2,727,881 A | 2/1955 | Caldwell et al. | |
| 2,720,502 A | 10/1955 | Caldwell | |
| 2,822,348 A | 1/1958 | Haslam | |
| 3,047,539 A | 7/1962 | Pengilly | |
| 3,907,868 A | 9/1975 | Currie et al. | |
| 3,907,926 A | 9/1975 | Brown et al. | |
| 4,011,285 A | 3/1977 | Seymour et al. | |
| 4,096,156 A | 6/1978 | Freudenberger et al. | |
| 4,128,526 A | 12/1978 | Borman | |
| 4,355,155 A | 10/1982 | Nelson | |
| 4,469,851 A | 9/1984 | Charles et al. | |
| 4,579,884 A | 4/1986 | Liu | |
| 4,598,117 A | 7/1986 | Liu et al. | |
| 4,609,680 A | 9/1986 | Fujita et al. | |
| 5,122,551 A | 6/1992 | Gallucci et al. | |
| 5,266,601 A | 11/1993 | Kyber et al. | |
| 5,326,806 A | 7/1994 | Yokoshima et al. | |
| 5,413,681 A | 5/1995 | Tustin et al. | |
| 5,451,611 A * | 9/1995 | Chilukuri et al. ............. | 521/48.5 |
| 5,559,159 A * | 9/1996 | Sublett et al. ............... | 521/48.5 |
| 6,162,837 A | 12/2000 | Gerking et al. | |
| 6,410,607 B1 | 6/2002 | Ekart et al. | |
| 6,515,044 B1 | 2/2003 | Idel et al. | |
| 6,706,843 B1 | 3/2004 | Ishihara et al. | |
| 6,794,463 B2 | 9/2004 | Aramaki et al. | |
| 6,887,909 B2 | 5/2005 | Kawamura et al. | |
| 7,183,362 B2 | 2/2007 | Hirokane et al. | |
| 7,388,067 B2 | 6/2008 | Leemans et al. | |
| 2002/0012807 A1* | 1/2002 | Kurian et al. ............. | 428/480 |
| 2002/0188073 A1 | 12/2002 | Uno et al. | |
| 2004/0059084 A1 | 3/2004 | Hirokane et al. | |
| 2005/0209435 A1 | 9/2005 | Hirokane et al. | |
| 2007/0244242 A1 | 10/2007 | Agarwal et al. | |
| 2007/0275242 A1 | 11/2007 | Gopal et al. | |

FOREIGN PATENT DOCUMENTS

| | | |
|---|---|---|
| EP | 0127981 | 12/1984 |
| EP | 0683201 A1 | 11/1995 |
| EP | 1437377 | 7/2004 |
| GB | 1500577 | 2/1978 |
| GB | 2098231 A | 11/1982 |
| JP | 2000256472 | 9/2000 |
| JP | 2000256920 | 9/2000 |
| JP | 200589572 | 4/2007 |
| KR | 20010083551 | 1/2001 |
| WO | 9950332 | 7/1999 |
| WO | 03066704 | 8/2003 |
| WO | WO2007111774 | 10/2007 |

OTHER PUBLICATIONS

Swedish Patent Office, International Search Report, International Application No. PCT/US07/074211, Date of Mailing: Mar. 6, 2007.
Swedish Patent Office, PCT Wrttten Opinion of the ISA, International Application No. PCT/US07/074211, Date of Mailing: Mar. 6, 2007.
European Patent Office, International Search Report, International Application No. PCT/US07/002197, Date of Mailing: Jun. 19, 2007.
S.H. Mansour et al., "Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.
"GE Gives Plastic Bottle Recycling a New Spin"; ChemicalProcessing.com, Aug. 25, 2006 [online], accessed via the internet [retrieved on Oct. 14, 2009], URS: <http://www.chemicalprocessing.com/industrynews/2006/056.html>, 2 pages. Pawlak,et al.; "Characterization of Scrap Poly(ethylene Terephthalate)"; European Polymer Journal; 36; pp. 1875-1884; (2000).

* cited by examiner

*Primary Examiner* — James Seidleck
*Assistant Examiner* — Frances Tischler
(74) *Attorney, Agent, or Firm* — Cantor Colburn LLP

(57) ABSTRACT

A composition comprising a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component. Methods for making such copolymers and articles made from such copolymers.

35 Claims, No Drawings

POLYTRIMETHYLENE TEREPHTHALATE (PTT) DERIVED FROM POLYETHYLENE TEREPHTHALATE (PET) AND CONTAINING PET RESIDUES

CROSS REFERENCE TO RELATED APPLICATIONS

This application claims priority to U.S. Provisional Applications, Ser. No. 60/820447 filed on Jul. 26, 2006, Ser. No. 60/763093 filed on Jan. 27, 2006 and Ser. No. 60/777901 filed on Mar. 1, 2006, all of which are incorporated herein by reference in their entirety.

BACKGROUND OF THE INVENTION

Polyethylene terephthalate (also referred to as "PET") is a polyester of terephthalic acid and ethylene glycol and can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance for mineral oils, solvents and acids but not to bases. Semi-crystalline PET has good strength, ductility, stiffness and hardness. Amorphous PET has better ductility but less stiffness and hardness. PET is used to make bottles for soft drinks, fibers for a variety of applications and other household and consumer products.

Unfortunately, despite recycling efforts, billions of pounds of PET still become solid wastes that are dumped into landfills or incinerated annually all over the world. The substantial amount of PET that is disposed into landfills creates significant waste. The incineration of PET destroys a material made from non-renewable hydrocarbon resources that could be used more effectively.

Polytrimethylene terephthalate (also referred to as "PTT" herein) is known to be useful as an engineering thermoplastic for injection molding applications, as described in U.S. Pat. No. 5,326,806. In general, PTT is prepared by reacting, at elevated temperature, a molar excess of 1,3-propanediol with terephthalic acid in a multi-stage (esterification/polycondensation) process, with removal of by-product water, for a time effective to produce polytrimethylene terephthalate. The polymerization conditions are selected so as to produce molten polyester having a target intrinsic viscosity of at least about 0.4 dl/g, preferably about 0.4 to about 1.0 dl/g. Polytrimethylene terephthalate may also be produced by the reaction of 1,3-propanediol with dimethyl terephthalate.

Unfortunately, conventional processes for preparing PTT do not meet the long felt need of reducing the amount of PET scrap that is ordinarily incinerated or buried in landfills. Preparing PTT from monomers requires a substantial amount of energy and it would be desired to develop novel processes for making PTT from non-monomeric sources. It would also be useful to develop a modified PTT random copolymer from PET, instead of monomers, that exhibited comparable performance properties as monomer-derived PTT.

For the foregoing reasons, there is a need to develop improved processes for making polytrimethylene terephthalate from PET, instead of monomers.

For the foregoing reasons, there is a need to develop new materials having performance properties similar to monomer-based polytrimethylene terephthalate, but that are derived from PET.

BRIEF DESCRIPTION OF THE INVENTION

The invention relates to a composition comprising a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component.

In one embodiment, the invention relates to an article molded or extruded from such a composition.

In another embodiment, the invention relates to a process for making such a composition, which involves the steps of:

(a) depolymerizing a polyethylene terephthalate component selected from the group consisting of polyethylene terephthalate and polyethylene terephthalate copolymers by reacting (i) the polyethylene terephthalate component with (ii) 1,3-propane diol at a pressure that is at least atmospheric pressure in the presence of a catalyst component, under an inert atmosphere conditions sufficient to depolymerize the polyethylene terephthalate component into a molten mixture containing polyethylene terephthalateoligomers, polytrimethylene terephthalate oligomers, mixed diol oligomers, 1,3-propane diol, and ethylene glycol;

wherein the polyethylene terephthalate component and the 1,3-propane diol are combined in the liquid phase under agitation and the 1,3 propane diol is refluxed back into the reactor during step(a); and (b) subjecting the molten mixture to subatmospheric pressure and increasing the temperature of the molten mixture to a temperature that is sufficient to form a polytrimethylene terephthalate random copolymer that (1) is derived from the polyethylene terephthalate component selected from the group consisting of polyethylene terephthalate and polyethylene terephthalate copolymers and (2) contains at least one residue derived from the polyethylene terephthalate component.

In another embodiment, the invention relates to a process for making such a composition, in which the process involves:

(a) depolymerizing a polyethylene terephthalate component selected from the group consisting of polyethylene terephthalate and polyethylene terephthalate copolymers by agitating the polyethylene terephthalate component with ethylene glycol in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, ethylene glycol, and combinations thereof;

(b) adding 1,3-propane diol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing trimethylene terephthalate moieties, propylene glycol, ethylene glycol, and combinations thereof; and (c) increasing the temperature of the second molten mixture under subatmospheric conditions and agitation to a temperature from 240° C. to 260° C., thereby forming a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component.

These and other features, aspects, and advantages of the present invention will become better understood with reference to the following description and appended claims.

DETAILED DESCRIPTION OF THE INVENTION

The invention is based on the remarkable discovery that it is now possible to make a modified polytrimethylene terephthalate component derived from poly (ethylene terephthalate), e.g., used PET soft drink bottles. Unlike conventional polytrimethylene terephthalate (polytrimethylene terephthalate that is derived from monomers), the modified-polytrimethylene terephthalate component contains polyethylene terephthlate residues, e.g., materials such as ethylene glycol and isophthalic acid groups. Advantageously, despite using a polytrimethylene terephthalate that is structurally different from virgin, monomer-based polytrimethylene terephthalate, our polytrimethylene terephthalate exhibits similar performance properties as monomer-based polytrimethylene terephthalate.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector @273 and 295 nanometers and Water 410 refractomer; (iii) Mobile phase: 5% HFIP 95% chloroform; (iv) GPC columns: Polymer Labs PL HFIPgel 250×4.6 mm, (v) Flow rate: 0.3 ml/min;(vi) Injection volume 10 µl; (vii) Polystyrene standards: Polymer Lab's Easical PS-1, 580-7,500,000 Da.

The invention relates to a composition comprising a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component.

The residue derived from polyethylene terepthalate which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin containing compounds, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, including calcium, magnesium, sodium and potassium salts, phosphorous-containing compounds and anions, sulfur-containing compounds and anions, napthalane dicarboxylic acids, 1,3-propane diol groups, and combinations thereof.

Depending on factors such as polyethylene terephthalate and polyethylene terephthalate copolymers, the residue can include various combinations. In one embodiment, for instance, the residue derived from the polyethylene terephthalate component comprises mixtures of ethylene glycol and diethylene glycol. Such mixtures can include additional materials, such as isophthalic acid. Such mixtures can also include cis isomer of 1,3-cyclohexane dimethanol, cis isomer of 1,4-cyclohexane dimethanol, trans isomer of 1,-3 cyclohexane dimethanol, trans isomer of 1,4 cyclohexane dimethanol and combinations thereof. In one embodiment, the residue derived from the polyethylene terephthalate component can selected from the group of cis isomer of 1,3-cyclohexane dimethanol, cis isomer of 1,4-cyclohexane dimethanol, the trans isomer of 1,-3-cyclohexane dimethanol, trans isomer of 1,4-cyclohexane dimethanol and combinations thereof. In another embodiment, the residue derived from the polyethylene terepthalate component can be selected from the group consisting of ethylene glycol groups, diethylene glycol groups, isophthalic acid groups, cis isomer of 1,3-cyclohexane dimethanol, trans isomer of 1,3-cyclohexane dimethanol, cis isomer of 1,4-cyclohexane dimethanol, trans isomer of 1,4-cyclohexane dimethanol, and combinations thereof. In another embodiment, the residue derived from the polyethylene terephthalate component comprises mixtures of ethylene glycol, diethylene glycol, and antimony-, germanium-, tin-, titanium- or cobalt-containing compounds. As above, in such mixtures, at least one residue derived from the polyethylene terephthalate component further comprises isophthalic acid groups.

The molar amounts of the residue derived from the polyethylene terephthalate component can vary. In one embodiment, the residue selected from the polyethylene terephthalate component is selected from the group consisting of ethylene glycol groups, diethylene glycol groups, and cyclohexane dimethanol groups and is in an amount ranging from 0.1 to 10 mole %, based on 100 mole % of glycol in the composition, e.g., molding composition. In another embodiment, the residue derived from the polyethylene terephthalate component further comprises isophthalic acid groups in an amount ranging from 0 to 10 mole %, based on 100 mole % of acid functionality in the polytrimethylene terephthalate random copolymer. The total amount of materials of the polyethylene terephthalate residue can vary. For instance, sometimes, mixtures of ethylene glycol groups, diethylene glycol groups, cyclohexane dimethanol groups, and isophthalic acid groups can be in an amount ranging from 1.8 to 2.5 wt %, or from 0.5 to 2 wt %, or from 1 to 4 wt. %. The diethylene glycol group can be present in an amount ranging from 0.1 to 10 mole %, based on 100 mole % of glycol the molding composition. The isophthalic acid group is present in an amount ranging from 0.1 to 10 mole %, based on 100 mole % of acid in the molding composition.

In one embodiment, further described below, the polytrimethylene terephthalate random copolymer can be further derived from a 1,3-propane diol that is derived from biomass. The biomass can include but not be limited to a sugar, e.g., sugars derived from a starch or a cellulosic source, a grain including but not limited to a grain selected from the group consisting of corn, wheat, and combinations thereof. The biomass can also include other hydrocarbons that are biologically derived and suitable for a fermentation process or a chemical process to yield 1,3 propane diol. Examples of such suitable biomass materials include and are not limited to glycerine, 3-hydroxy propanoic acid.

Our modified polytrimethylene terephthalate random copolymer can be made from a novel process in which PET is depolymerized and placed under conditions such that the resulting depolymerized PET molten mixture is polymerized into the modified polytrimethylene terephthalate random copolymer. For instance, the modified polytrimethylene terephthalate random copolymer can be made by a process that involves:

(a) depolymerizing a polyethylene terephthalate component selected from the group consisting of polyethylene terephthalate and polyethylene terephthalate copolymers by reacting (i) the polyethylene terephthalate component with (ii) 1,3-propane diol at a pressure that is at least atmospheric pressure in the presence of a catalyst component, under an inert atmosphere conditions sufficient to depolymerize the polyethylene terephthalate component into a molten mixture containing polyethylene terephthalate oligomers, polytrimethylene terephthalate oligomers, mixed diol oligomers, 1,3-propane diol, and ethylene glycol; such that the polyethylene terephthalate component and the 1,3-propane diol are combined in the liquid phase under agitation and the 1,3 propane diol is refluxed back into the reactor during step(a); and (b) subjecting the molten mixture to subatmospheric pressure and increasing the temperature of the molten mixture to a temperature that is sufficient to form a polytrimethylene terephthalate random copolymer that (1) is derived from the polyethylene terephthalate component selected from the group consisting of polyethylene terephthalate and polyethylene terephthalate copolymers and (2) contains at least one residue derived from the polyethylene terephthalate component.

The PET component from which the modified polytrimethylene terephthalate random copolymer is made from generally includes recycle (scrap) PET in flake, powder/chip or pellet form. Before use, the PET is generally processed to remove impurities such as paper, adhesives, olefinic polymers and other contaminants. Also, the PET component can include PET that is not waste in flake, chip or pellet form. As such, PET that would ordinarily become solid waste can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, polybutylene terephthalate, polyester naphthalates, and combinations thereof.

The temperatures that are used in the process can vary. For instance, the polyethylene terephthalate component can be depolymerized at a temperature ranging from 180° C. to 260° C. In another embodiment, when the molten mixture is subjected to subatmospheric pressure, the temperature of the molten mixture can be increased to a temperature ranging from 240° C. to 270° C.

As indicated above, in some situations, the polytrimethylene terephthalate random copolymer can be further derived from a 1,3-propane diol that is derived from biomass.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based diol can be obtained from several sources. For instance, the following process can be used to obtain biomass-based 1,4-butanediol. Agriculture based biomass such as corn a grain or grain derived sugar can be converted into succinic acid by a simple process such as fermentation process in presence of a microbe. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Biomass derived-1,4-butanediol can also be converted to tetrahydrofuran, and further converted to polytetrahydrofuran, also known as polybutylene oxide glycol. Another process that describes converting succinic acid into 1,4-butane diol is described in Life Cycles Engineering Guidelines, by Smith et al., as described in EPA publication EPA/600/R-1/101 (2001). Biomass based 1,3-propanediol can be obtained from commercial source such as from an aerobic fermentation process used by DuPont, Tate and Lyle Bio Products.

The process for making our modified polytrimethylene terephthalate random copolymers, however, is not limited to those processes that depolymerize a polyethylene terephthalate component with 1,3-propane diol. In one embodiment, the modified polytrimethylene terephthalate random copolymer can be made with a process that involves (a) depolymerizing a polyethylene terephthalate component selected from the group consisting of polyethylene terephthalate and polyethylene terephthalate copolymers by agitating the polyethylene terephthalate component with ethylene glycol in a reactor at a pressure that is at least atmospheric pressure in the presence of a catalyst component under conditions sufficient to depolymerize the polyethylene terephthalate component into a first molten mixture containing components selected from the group consisting of ethylene terephthalate oligomers, ethylene glycol and combinations thereof, (b) adding 1,3-propane diol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing trimethylene terephthalate moieties, mixed diol oligomers, propylene glycol, ethylene glycol, and combinations thereof; and (c) increasing the temperature of the second molten mixture under subatmospheric conditions and agitation to a temperature from 240° C. to 260° C., thereby forming a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component.

The temperatures used during the process can vary. The temperature at which the polyethylene terephthalate component can be depolymerized, for instance, can range from 190° C. to 250° C. Such temperatures can be used under an inert atmosphere.

Further, the process in which the PET component is depolymerized with ethylene glycol can include an embodiment in which the polytrimethylene terephthalate random copolymer is further derived from a 1,3-propane diol that is derived from biomass by a process that involves numerous conversions, e.g. biomass to starch to sugar to 1,3-propane diol. The biomass can be a grain, e.g., corn, wheat, and combinations thereof A process for preparing the modified polytrimethylene terephthalate random copolymer may be carried out in the presence of catalysts. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

In use, the modified polytrimethylene terephthalate random copolymer can make numerous articles having useful properties.

Our modified polytrimethylene terephthalate random copolymer can be molded into useful articles by a variety of means by many different processes to provide useful molded products such as injection, extrusion, rotation, foam molding, calender molding and blow molding and thermoforming, compaction, melt spinning and melt blown form articles. Non limiting examples of the various articles that could be made from the thermoplastic composition of the present invention include fibers such as fabrics, injection molded articles such as connectors, blow molded articles such as fluid tanks. In one embodiment the polyester may be blended with other conventional polymers.

As such, our invention includes articles molded or extruded a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component can be any of the above-mentioned residues, depending on the application. The residue derived from the polyethylene terepthalate component, for instance, can be selected from the group consisting of ethylene glycol groups, diethylene glycol groups, isophthalic acid groups, cis isomer of 1,3-cyclohexane dimethanol, trans isomer of 1,3-cyclohexane dimethanol, cis isomer of 1,4-cyclohexane dimethanol, trans isomer of 1,4-cyclohexane dimethanol, and combinations thereof.

The modified polytrimethylene terephthalate imparts useful properties to articles. Such properties can vary, depending on factors such as the performance properties that are required, the equipment used, process parameters, and the like. In another embodiment, the inherent viscosity ranges from 1 to 1.3 dL/g. In another embodiment, the inherent viscosity ranges from 0.95 to 1.05 dL/g. All inherent viscosities in this application refer to those viscosities measured in a solution of 60 wt. % phenol and 40 wt. % 1,1,2,2-tetrachloroethane at 25° C.

The melting point of the modified polytrimethylene terephthalate random copolymer is at least 200° C., or at least 210° C. In another embodiment, the melting point ranges from 220 to 230° C. In another embodiment, the melting point ranges from 210 to 225° C. The crystallization temperature of the modified polytrimethylene terephthalate random copolymer is at least 120° C. In another embodiment, the crystallization temperature ranges from 140 to 150° C.

The tensile strength (@ break) of the modified polytrimethylene terephthalate random copolymer is at least 30 MPa. In another embodiment, the tensile strength ranges from 30 MPa to 100 MPa. In another embodiment, the tensile strength ranges from 51 to 565 MPa. The tensile elongation (@ yield) of the modified polytrimethylene terephthalate random copolymer is at least 2%.

In another embodiment, the tensile elongation (break) ranges from 2% to 10%. In another embodiment, the tensile elongation (@ break) ranges from 10 to 300%. The notched izod strength of the modified polytrimethylene terephthalate random copolymer is at least 10 J/m. In another embodiment, the notched izod strength ranges from 20 J/m to 60 J/m. In another embodiment, the notched izod strength ranges from 20 to 40 J/m.

Other embodiments include admixtures of PTT derived from PET and PET copolymers with other functional ingredients that includes fillers, alloys with other polymers, such as polycarbonate, impact modifiers, flame retardants, stabilizers, nucleants and combinations thereof.

Our invention provides previously unavailable advantages. Our invention, for instance, provides an effective process that effectively prepares a modified PTT random copolymer from polyethylene terephthalate instead of monomers. Further, our modified PTT random copolymer exhibits useful performance properties. Further, it is not possible to make articles from our modified PTT random copolymer, and further reduce the amount of polyethylene terephtalate that is ordinarily incinerated or placed into landfills.

The process for making the PET-derived random, modified PTT copolymers, for instance, can also reduce carbon dioxide emissions and carbon waste. Since the PET-derived polyester random modified PTT copolymers made by the inventive process are made from PET and not monomers, the process can reduces the amount of carbon dioxide emissions and carbon waste. Additionally, when bio derived 1,3, propane diol is used, there is a further improvement in carbon dioxide impact of the modified PTT copolymer.

The invention is further described in the following illustrative examples in which all parts and percentages are by weight unless otherwise indicated.

EXAMPLE 1

Green colored recycle PET pellets were obtained from St. Jude, a supplier in North America. The post consumer recycle PET pellets had an iv specification of 0.68 to 0.78 and a melting point specification of 245 to 255° C. The 1,3-propanediol (PDO) was obtained from Shell Chemicals and had a purity specification of >99.9 wt. %. The TPT catalyst is the commercial Tyzor grade available from Dupont.

70.0 gms of recycle PET pellets were mixed with 84.04 gms of 1,3-propanediol (molar ratio 1:3) in a 500 ml reaction kettle. The temperature of the oil bath (for the reaction kettle) was ramped up from 180 to 255° C. The agitator speed was set at 20 rpm. At this stage, 0.08 ml of TPT catalyst was also added to the reaction mix. The reaction mass achieved a temperature of 214° C. (boiling point of 1,3-propanediol) and the PDO was refluxed at this temperature for 2 hours. This is known as the PET glycolysis stage.

For the poly stage, the reflux condenser was removed and a vacuum was applied to the reaction kettle. The excess diol and other volatile fractions were collected in a 'Dean and Stark' condenser. The speed of the agitator was increased to 220 rpm. A vacuum pump was used to reduce the pressure at 40 torr/min to 0.15 torr. The increase in molecular weight of the polymer mass was monitored by the increase in torque of the overhead stirrer. Upon reaching a maximum torque value for the agitator, the stir rate was reduced and the reaction was allowed to proceed. This polymerization stage was completed after three successive maximum torque reading were attained at 220, 120 and 60 rpm. About 10 gms of the polymer were collected from the reaction kettle for further testing and analysis. The following tests were conducted on the polymer sample: intrinsic viscosity (IV), NMR analysis and DSC analysis. NMR analysis of the resin confirmed the composition of the material to consist of 98.3 mol % polytrimethylene terephthalate and 1.63 mol % residual PET. The intrinsic viscosity of the material was 0.736 dl/g. The melting and crystallization temperatures, measured by DSC (heating rate of 20° C./min), was 222° C. and 144° C. The heat of fusion and crystallization for these transitions was 36 and −37 J/g, respectively.

Although the present invention has been described in detail with reference to certain preferred versions thereof, other variations are possible. Therefore, the spirit and scope of the appended claims should not be limited to the description of the versions contained therein.

What is claimed is:

1. A composition comprising a polytrimethylene terephthalate random copolymer that (1) is derived from 1,3-propane diol and a polyethylene terephthalate component selected from the group consisting of polyethylene terephthalate and polyethylene terephthalate copolymers and (2) contains at least one residue derived from the polyethylene terephthalate component, wherein the at least one residue derived from the polyethylene terephthalate component comprises 0.1 to 10 mole % of diethylene glycol, based on 100 mole % of glycol in the polytrimethylene terephthalate random copolymer.

2. A process for making the composition of claim 1, the process comprising:
(a) depolymerizing a polyethylene terephthalate component selected from the group consisting of polyethylene terephthalate and polyethylene terephthalate copolymers by reacting (i) the polyethylene terephthalate component with (ii) the 1,3-propane diol at a pressure that is at least atmospheric pressure in the presence of a catalyst component, under an inert atmosphere, and under conditions sufficient to depolymerize the polyethylene terephthalate component into a molten mixture containing polyethylene terephthalate oligomers, polytrimethylene terephthalate oligomers, mixed diol oligomers, 1,3-propane diol, and ethylene glycol;
wherein the polyethylene terephthalate component and the 1,3-propane diol are combined in the liquid phase under agitation and the 1,3-propane diol is refluxed back into the reactor during step (a);
(b) subjecting the molten mixture to subatmospheric pressure and increasing the temperature of the molten mixture to a temperature that is sufficient to form a polytrimethylene terephthalate random copolymer that (1) is derived from the polyethylene terephthalate component selected from the group consisting of polyethylene terephthalate and polyethylene terephthalate copolymers and (2) contains at least one residue derived from the polyethylene terephthalate component.

3. The composition of claim 1, wherein the at least one residue derived from the polyethylene terephthalate component further comprises ethylene glycol groups, terephthalic acid groups, isophthalic acid groups, antimony-containing compounds, germanium-containing compounds, titanium-containing compounds, cobalt-containing compounds, tin-containing compounds, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, phosphorous-containing compounds and anions, sulfur-containing compounds and anions, naphthalene dicarboxylic acids, 1,3-propane diol groups, and combinations thereof.

4. The composition of claim 1, wherein the at least one residue derived from the polyethylene terephthalate component comprises mixtures of ethylene glycol and diethylene glycol.

5. The composition of claim 1, wherein the at least one residue derived from the polyethylene terephthalate component further comprises the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, or combinations thereof.

6. The composition of claim 1, wherein the at least one residue derived from the polyethylene terephthalate component further comprises isophthalic acid groups in an amount ranging from 0.1 to 10 mole %, based on 100 mole % of acid functionality in the polytrimethylene terephthalate random copolymer.

7. An article molded or extruded from the composition of claim 1.

8. An article molded or extruded comprising the random copolymer produced from the process of claim 2.

9. The composition of claim 1, wherein the polytrimethylene terephthalate random copolymer has a melting point of at least 200° C. and a crystallization temperature of at least 120° C.

10. The composition of claim 1, wherein the total amount of ethylene glycol, diethylene glycol, cyclohexane dimethanol, and isophthalic acid residues from the at least one polyethylene terephthalate component, when present, is 0.5 to 4 wt %, based on the weight of the polytrimethylene terephthalate random copolymer.

11. The composition of claim 1, wherein the at least one residue derived from the polyethylene terephthalate component futher comprises ethylene glycol groups, cyclohexane dimethanol groups, or combinations thereof, in an amount ranging from 0.1 to 10 mole %, based on 100 mole % of glycol in the polytrimethylene terephthalate random copolymer.

12. The composition of claim 1, wherein the at least one residue derived from the polyethylene terephthalate component further comprises ethylene glycol groups, isophthalic acid groups, the cis isomer of 1,3-cyclohexane dimethanol, the trans isomer of 1,3-cyclohexane dimethanol, the cis isomer of 1,4-cyclohexane dimethanol, the trans isomer of 1,4-cyclohexane dimethanol, or combinations thereof.

13. The composition of claim 1, wherein the at least one residue derived from the polyethylene terephthalate component further comprises ethylene glycol groups, cobalt-containing compounds, antimony-containing compounds, tin-containing compounds, germanium-containing compounds, or combinations thereof.

14. The composition of claim 1, wherein the 1,3-propane diol is derived from biomass.

15. The composition of claim 14, wherein the biomass is a grain selected from the group consisting of corn, wheat, and a combination thereof.

16. The composition of claim 1, wherein the polytrimethylene terephthalate random copolymer has an inherent viscosity of 0.95 to 1.05 dL/g, measured in a solution of 60 wt. % phenol and 40 wt. % 1,1,2,2-tetrachloroethane at 25° C.

17. The composition of claim 1, wherein the polytrimethylene terephthalate random copolymer has at least one of a tensile strength at break of 30 MPa, a tensile elongation at break of 2 to 10%, and a notched Izod strength of at least 10 J/m.

18. The process of claim 2, wherein the polyethylene terephthalate component is depolymerized at a temperature ranging from 180° C. to 260° C.

19. The process of claim 2, wherein the temperature of the molten mixture is increased to a temperature ranging from 240° C. to 270° C.

20. The process of claim 2, wherein the polyethylene terephthalate component is in flake or pellet form.

21. The process of claim 2, wherein the polyethylene terephthalate component excludes polyethylene terephthalate component in powder or chip form.

22. The process of claim 2, wherein the 1,3-propane diol is derived from biomass.

23. The process of claim 22, wherein the biomass is a grain selected from the group consisting of corn, wheat, and a combination thereof.

24. The process of claim 2, wherein the 1,3-propane diol is derived from biomass by a process that converts biomass to starch to sugar to 1,3-propane diol.

25. The process of claim 22, wherein the biomass comprises hydrocarbons that are suitable for a fermentation process or a chemical process to yield 1,3-propane diol.

26. The process of claim 25, wherein the hydrocarbons are glycerine and 3-hydroxy propanoic acid.

27. A process for making the composition of claim 1, the process comprising:
   (a) depolymerizing a polyethylene terephthalate component selected from the group consisting of polyethylene terephthalate and polyethylene terephthalate copolymers by agitating the polyethylene terephthalate component with ethylene glycol in a reactor at a pressure that is at least atmospheric pressure in the presence of a catalyst component under conditions sufficient to depolymerize the polyethylene terephthalate component into a first molten mixture containing components selected from the group consisting of oligomers containing ethylene terephthalate moieties, ethylene glycol, and combinations thereof;
   (b) adding 1,3-propane diol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing trimethylene terephthalate moieties, mixed diol oligomers, propylene glycol, ethylene glycol, and combinations thereof; and
   (c) increasing the temperature of the second molten mixture under subatmospheric conditions and agitation to a temperature from 240° C. to 260° C., thereby forming a polytrimethylene terephthalate random copolymer that (1) is derived from polyethylene terephthalate component selected from the group consisting of polyethylene terephthalate and polyethylene terephthalate copolymers and (2) contains at least one residue derived from the polyethylene terephthalate component.

28. The process of claim 27, wherein the polyethylene terephthalate component is depolymerized at a temperature ranging from 190° to 250° C., under an inert atmosphere.

29. The process of claim 27, wherein the polyethylene terephthalate component is in flake or pellet form.

30. The process of claim 27, wherein the polyethylene terephthalate component excludes polyethylene terephthalate component in powder or chip form.

31. The process of claim 27, wherein the polytrimethylene terephthalate random copolymer is further derived from a 1,3-propane diol that is derived from biomass.

32. The process of claim 31, wherein the biomass is a grain selected from the group consisting of corn, wheat, and a combination thereof.

33. The process of claim 31, wherein the 1,3-propane diol is derived from biomass by a process that converts biomass to starch to sugar to 1,3-propane diol.

34. The process of claim 31, wherein the biomass comprises hydrocarbons that are suitable for a fermentation process or a chemical process to yield 1,3-propane diol.

35. The process of claim 34, wherein the hydrocarbons are glycerine and 3-hydroxy propanoic acid.

\* \* \* \* \*

UNITED STATES PATENT AND TRADEMARK OFFICE
CERTIFICATE OF CORRECTION

| | | |
|---|---|---|
| PATENT NO. | : 7,902,264 B2 | Page 1 of 1 |
| APPLICATION NO. | : 11/616373 | |
| DATED | : March 8, 2011 | |
| INVENTOR(S) | : Michael Determan et al. | |

It is certified that error appears in the above-identified patent and that said Letters Patent is hereby corrected as shown below:

Title Page, Item (74), Attorney, Agent, or Firm, delete "Cantor Colburn LLP" and insert therefor --Cantor Colburn LLP, Diderico van Eyl--.

Signed and Sealed this
Twenty-fifth Day of October, 2011

David J. Kappos
*Director of the United States Patent and Trademark Office*